United States Patent Office 3,438,794
Patented Apr. 15, 1969

3,438,794
RELEASE COATING COMPOSITIONS CONSISTING ESSENTIALLY OF WATER SOLUBLE SALTS OF CARBOXYMETHYL CELLULOSE (OR ALGINIC ACID) AND WATER-SOLUBLE SALTS OF HIGHER ALIPHATIC SULFATES
Daniel Dickerson Ritson, Riverside, Charles Frazier, Stamford, and Anthony Thomas Coscia, South Norwalk, Conn., assignors to American Cyanamid Company, Stamford, Conn., a corporation of Maine
No Drawing. Continuation-in-part of application Ser. No. 427,081, Jan. 21, 1965. This application June 19, 1967, Ser. No. 647,174
Int. Cl. C08b 21/30, 25/00
U.S. Cl. 106—194
6 Claims

ABSTRACT OF THE DISCLOSURE

A composition consisting essentially of (a) a major amount of a material selected from the group consisting of the water-soluble salts of carboxymethyl cellulose, the water-soluble salts of alginic acid, and mixtures of said salts; and (b) a minor amount of a water-soluble salt of a $C_6$–$C_{20}$ straight chain aliphatic sulfate has been discovered to be a release agent, i.e., when present on a surface it decreases the adhesiveness of the surface with respect to pressure-sensitive adhesive material.

---

This is a continuation-in-part of our copending application Ser. No. 427,081 filed on Jan. 21, 1965, and now abandoned.

The present invention relates to novel release compositions in dry and solution state, and to surfaces coated with said compositions. The invention includes surfaces coated on one side or on both sides with said compositions.

The term "release composition," as used herein, means a composition which, when applied to a surface, decreases the adhesiveness of the surface with respect to pressure-sensitive adhesive material.

Dabroski U.S. Patent No. 3,067,057 discloses release compositions which consist essentially of mixtures of a water-dispersible, heat-reactive aldehyde or imide resin, a sodium $C_{11}$–$C_{21}$ straight chain aliphatic sulfate as emulsifying agent, and an oil-resistant, film-forming polymer derived from a polymeric reaction product of one or more monoene and/or diene monomers and a monomeric polymerizable carboxylic acid or anhydride with a double bond $\alpha,\beta$ to the carboxylic group.

The compositions of this patent being complex emulsions are inconvenient to prepare.

The discovery has now been made that a composition consisting essentially of a major amount of a material selected from the group consisting of the water-soluble salts of carboxymethyl cellulose, the water-soluble salts of alginic acid, and mixtures of these salts, and a minor amount of a water-soluble salt of a higher ($C_6$–$C_{20}$) substantially straight chain aliphatic sulfate is an effective release agent for pressure-sensitive tapes when present in customary amount.

In preferred instances the compositions of the present invention possess the following advantages:

(1) They may exist in dry or in liquid state, and in either state they are storage-stable.

(2) They are composed of commercially available materials, and are prepared simply by mixing these materials together.

(3) They are soluble both in water and in certain aqueous volatile organic solvent mixtures, and thus can be applied as quick-drying solutions.

(4) They decrease the pull required to peel pressure-sensitive adhesive from backing material by more than about 50%, without significantly decreasing the adhesiveness of the adhesive material which has thus been removed. The compositions are thus very effective for their intended purpose.

(5) The compositions develop their release properties at room temperature. Surfaces treated with solutions of the composition may thus be allowed to dry at room temperature, and heating although advantageous is not required.

(6) The compositions are odorless and non-toxic. They are consequently suitable for use on surfaces intended for use in contact with food.

The sodium, potassium, ammonium, magnesium and triethylamine salts of carboxymethyl cellulose and of alginic acid are suitable for use as the major component of compositions of the present invention.

The minor component of the compositions of the present invention is a water-soluble salt of a higher substantially straight chain aliphatic sulfate. These sulfates have the formula

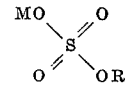

wherein M represents a water-soluble positive ion (for example those listed in the paragraph above), and R represents a $C_6$–$C_{20}$ substantially straight chain aliphatic substituent. Suitable substituents include hexyl, octyl, lauryl, hexadecyl, octyldecyl, decenyl and hexadecenyl.

As little as 1% of the aliphatic sulfate salt has proved effective in compositions of the present invention and there is, therefore, evidently no amount however small which will not impart some benefit. The release effect of the aliphatic sulfate increases as its proportion to the carboxymethyl cellulose or alginate salt rises, but the effectiveness of added increments of the aliphatic sulfate decreases when too much is present. It is uneconomic for the aliphatic sulfate salt to be present in major amount, that is, in amount greater than the weight of the carboxymethyl cellulose salt, of the alginate salt, or of the mixture of the two. The practical limits extend from about 1% to about 40% of the aliphatic compound based on the weight of the carboxymethyl cellulose salt or alginic acid salt.

The compositions of the present invention may be dry, free-flowing powders. Such powders can be prepared by mixing a powdered water-soluble salt of carboxymethyl cellulose or of alginic acid with a powdered water-soluble aliphatic sulfate of the type described. The resulting blend, however, releases dust when poured from 50 lb. sacks as is customary.

A dry, free-flowing mixture of these components which does not release dust under similar circumstances can be prepared by forming a solution of the carboxymethyl cellulose or alginic acid salt and aliphatic sulfate salt in desired ratio, and drum-drying the solutions so as to obtain brittle flakes. These flakes, when coarsely ground, are free-flowing and dissolve virtually as rapidly in water as the powder, yet do not release dust when unbagged and poured.

The compositions may be prepared in solution form. Water is a suitable solvent, and the solutions are of pumpable viscosity at solids contents up to about 10% or 20% by weight, depending principally upon the molecular weight of the carboxymethyl cellulose or alginic acid component and the temperature of the solution. Quick-drying solutions can be prepared by the use of aqueous ethanol, aqueous isopropanol, or aqueous acetone as solvents.

The compositions of the present invention may contain other materials heretofore used in release compositions in any amount so long as the release character of the compositions is not materially affected. The compositions thus may contain pigmentary material, for example, titanium dioxide or phthalocyanine blue. Moreover, the compositions may contain small amounts of supplementary film-forming materials, for example, water-soluble thermosetting acetone-formaldehyde resin or a small amount of an ethyl acrylate:acrylonitrile (70:30 molar ratio) copolymer. These film-forming materials are advantageously prepared as aqueous suspensions or solutions which are then added to an aqueous solution of the release blend.

The compositions of the present invention are applied in the form of solutions, in any of the ways in which release coating compositions have heretofore been applied in the past. Thus the solutions may be applied by a spray, by doctor blade, or by roller coater. If preferred, they may be sprayed upon the substrate to be protected. For topical application (as for example, when it is desired to provide the border of a glass plate with a release coating so as to facilitate removal of masking tape), spray application is particularly convenient and the aerosol mist which is produced releasing the material from pressure under a gas as from an "aerosol" bomb is very effective.

After application of the release agent to the surface to be protected, it is advantageous to dry the surface at a temperature in the range of 190–375° F. or such lower temperature as the nature of the substrate requires. However, heating is not necessary to develop a substantial part of the release properties of the composition, and satisfactory results are achieved when the treated surfaces are allowed to dry at room temperature.

The concentration of release agent in the solution and the amount of solution which is applied to the surface to be protected should be sufficient so that a substantially continuous but very thin coating of the release composition is deposited on the surface when the solvent evaporates. Such a coating is a fraction of a mil in thickness, which is equivalent to a fraction of a pound per thousand square feet. The optimum thickness of the coating has not yet been determined, but can be ascertained by laboratory trial following the test methods shown below.

The blends of the present invention exhibit release properties when applied to the principal surfaces normally contacted with pressure-sensitive adhesive material, for example, paper, rubber-latex impregnated paper, paint, aluminum, glass, melamine-formaldehyde, plastics and non-fibrous regenerated cellulose film.

The invention is further illustrated by the examples which follow. These examples are specific embodiments and are not to be construed as limitations upon the invention.

Example 1

The following illustrates the effectiveness of release compositions composed of sodium carboxymethyl cellulose and several water-soluble sodium higher aliphatic sulfates, according to the present invention.

Dry blends are prepared by mixing in each instance 5 g. of dry sodium carboxymethyl cellulose powder (CMC 70 of the Hercules Powder Co. 0.65–0.85 degree of substitution) with a sodium higher aliphatic sulfate as shown in the table below, and dissolving the blends in sufficient water to form 100 g. of solution. The blends dissolve rapidly, forming clear viscous solutions.

Each of the solutions is then coated by means of a No. 8 Meyers rod upon sheets of commercial backing paper base stock (30 lb. per 25" x 40"/500 ream basis weight) crepe kraft paper which had been saturated with a synthetic rubber latex and dried in amount equivalent to about 0.3 lb. of the blend (dry basis) per 1000 ft.$^2$ of paper surface. One sheet of the stock is left untreated as primary control and another sheet is coated as secondary control with a 5% by weight aqueous solution of sodium carboxymethyl cellulose which contains none of the aliphatic sulfate. The treated sheets are dried by being placed for 1 minute in an oven at 375° F.

The effectiveness of the release compositions is determined in each instance by pressing 3 inches of a 6-inch length of commercial masking take (crepe paper which carries a pressure-sensitive adhesive on one side) upon the treated surfaces of the paper, and the pull necessary to peel the adhesive tape from the sheet (the "initial pull to peel") is measured on a Suter tensile strength tester. The adhesiveness of the portion of the tape which has thus been peeled off is determined by pressing that portion of the tape upon an untreated area of the paper and measuring in the same manner the pull required to peel the tape therefrom; the result is the "reseal pull to peel." Most desirable are low "Initial Pull to Peel" and high reseal values. Results are as follows:

| Run No. | Release composition | | | Pull to peel, lb./inch | | |
|---|---|---|---|---|---|---|
| | Gms. CMC[1] | Na aliphatic sulfate | | Initial | | Reseal found |
| | | Percent[2] | Name | Found | Percent decr.[3] | |
| 1 | None | None | | 12.2 | | 12.2 |
| 2 | 5.0 | None | | 10.7 | 12.3 | 13.6 |
| 3 | 5.0 | 2.0 | Lauryl | 8.8 | 27.8 | |
| 4 | 5.0 | 3.0 | do | 8.6 | 29.4 | 12.0 |
| 5 | 5.0 | 30.0 | do | 5.5 | 53.0 | 11.1 |
| 6 | 5.0 | 10.0 | Octadecyl | 8.5 | 28.6 | |
| 7 | 5.0 | 10.0 | Hexadecenyl | 8.5 | 28.6 | |
| 8 | 5.0 | 3.0 | Octyl | 9.2 | 24.6 | 12.2 |
| 9 | 5.0 | 3.0 | Hexyl | 9.2 | 24.6 | 12.0 |

[1] Sodium carboxymethyl cellulose.
[2] Based on weight of sodium carboxymethyl cellulose.
[3] Based on run 1.

The results show that while sodium carboxymethyl cellulose alone acts as release agent to a slight extent, the presence of even a very minor amount of an aliphatic sulfate salt more than trebles the release effect. The results further show that despite this, the adhesiveness or "reseal" value of the tape is closely similar to that of the tape prior to application to the surface carrying the release blend.

Example 2

The procedure of Run 5 of Example 1 is repeated except that the surface which is protected is dried at room temperature. Results are substantially the same.

Example 3

The following illustrates the preparation of a dry non-dusting quick-dissolving release mixture according to the present invention and the preparation of solutions of the mixture in a volatile solvent.

A blend of 97 g. of sodium carboxymethyl cellulose and 3 g. of sodium lauryl sulfate is dissolved in 1000 g. of warm water. The resulting clear viscous solution is dried on a laboratory drum drier having a drum temperature of 275° F. The speed of rotation of the drum is adjusted so that the product which is removed by the doctor blade are brittle flakes.

Part of the flakes are pulverized to a coarse powder. This powder does not release a significant amount of dust when poured from a bag upon a flat surface.

The flakes dissolve within a few minutes in water, in 50% aqueous ethanol, and in 50% aqueous acetone. The powder dissolves more quickly in these solvents than the flakes.

Example 4

The following illustrates the release effect imparted by a blend of the triethylamine salt of carboxymethyl cellulose and the higher aliphatic sulfate.

To a mixture of 3 g. of carboxymethyl cellulose (free acid) and 0.3 g. of sodium lauryl sulfate is added 1 g. of triethylamine and the mixture is made up to 100 g. by addition of warm water. With stirring the components rapidly dissolve, forming a clear viscous solution. The solution is applied to backing paper stock by the method of Example 1 and the resulting paper possesses good release properties.

Example 5

The following illustrates the release effect of a blend of the present invention on regenerated cellulose film.

The procedure of run 4 of Example 1 is repeated, except that non-fibrous regenerated cellulose film containing glycerol as plasticizer is employed as the substrate instead of the backing paper of Example 1, and the drying is performed at 220° F. instead of 375° F. The resulting film possesses good release properties for pressure-sensitive adhesive ("Scotch") tape.

Example 6

The following illustrates the release effects of a composition of the present invention on glass.

(A) Half of one side of a plate glass panel is coated with a 1% by weight solution in water of sodium carboxymethyl cellulose and sodium lauryl sulfate in 95:5 weight ratio. The panel is dried at 220° F.

(B) A similar panel is similarly coated with the solution diluted to 0.3% solids, and the panel is dried at room temperature.

(C) Half of a similar panel is sprayed with a 1% by weight solution in aqueous ethanol of sodium carboxymethyl celluose and sodium lauryl sulfate in 95:5 weight ratio, and the panel is dried at room temperature.

Each of the treated portions of the panels possesses satisfactory release properties for masking tape.

Example 7

The following illustrates the effectiveness as release agents of compositions composed essentially of a major amount of a water-soluble salt of alginic acid and a minor amount of a water-soluble salt of a $C_6$–$C_{20}$ straight chain aliphatic sulfate.

To 100 g. of a 4% by weight solution of sodium alginate in water is added 4 g. of a 30% by weight solution of sodium lauryl sulfate in water. The resulting solution (containing the two materials in 4:1.2 weight ratio) is applied to backing paper and is tested thereon as release agent in comparison with untreated control backing paper, all by the method of Example 1. Results are as follows.

| Run No. | Release composition | | Pull to peel, lb./in. | | |
| --- | --- | --- | --- | --- | --- |
| | | | Initial | | |
| | Gms. | Agent | Found | Percent decr. | After reseal |
| 1 | | Control | 11.8 | | 10.5 |
| 2 | 4.0 | Na alginate | 5.8 | 50.6 | 12.0 |
| | 1.2 | Na lauryl sulfate | | | |

We claim:

1. A release composition consisting essentially of a major amount of a salt material selected from the group consisting of the water-soluble salts of carboxymethyl cellulose, the water-soluble salts of alginic acid, and mixtures of said salts; and a minor amount of a water-soluble salt of a $C_6$–$C_{20}$ straight chain aliphatic sulfate, the weight of said aliphatic sulfate being between about 30% and 40% of said salt material.

2. A release composition according to claim 1 wherein the salt material is a water-soluble salt of carboxymethyl cellulose.

3. A release composition according to claim 1 wherein the salt material is a water-soluble salt of alginic acid.

4. A release composition according to claim 1 wherein the aliphatic sulfate salt is sodium lauryl sulfate.

5. A release composition consisting essentially of volatile liquid having a dissolved content of about 0.1% to 10% by weight of a blend according to claim 1.

6. A release composition consisting essentially of aqueous ethanol having a dissolved content of about 0.1% to 10% by weight of a blend according to claim 1.

References Cited

UNITED STATES PATENTS

| | | | |
| --- | --- | --- | --- |
| 2,579,381 | 12/1951 | Funderburk | 106—194 |
| 2,631,082 | 3/1953 | Noyes et al. | 18—47 |
| 2,768,143 | 10/1956 | Henry | 252—363.5 |
| 2,986,471 | 5/1961 | Rudd | 106—2 |

OTHER REFERENCES

Gardiner et al.: National Paint, Varnish and Lacquer Association, August 1944, pp. 191–194.

Hollabaugh et al.: Ind. Eng. Chem. 37, 943–947 (1945).

The Merck Index (7th edition) (Merck & Co.) (1960), p. 943.

MORRIS LIEBMAN, *Primary Examiner.*

H. H. FLETCHER, *Assistant Examiner.*

U.S. Cl. X.R.

106—2, 197, 205